(12) United States Patent
Nishizawa (10) Patent No.: US 6,854,699 B2
(45) Date of Patent: Feb. 15, 2005

(54) CUP HOLDER DEVICE (75) Inventor: Satoshi Nishizawa, Yokohama (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/440,357

(22) Filed: May 19, 2003

(65) Prior Publication Data
US 2004/0016859 A1 Jan. 29, 2004

(30) Foreign Application Priority Data
Jul. 29, 2002 (JP) ........................................ 2002-219584

(51) Int. Cl.[7] ................................................. A47K 1/08
(52) U.S. Cl. ................ 248/311.2; 248/27.1; 248/298.1; 224/926; 297/194
(58) Field of Search .................... 248/311.2, 309.1, 248/398.1, 27.1; 224/483, 544, 556, 549, 552, 553, 926, 564, 281, 282; 297/194, 188, 188.15, 188.16, 188.17

(56) References Cited

U.S. PATENT DOCUMENTS

| 4,854,536 | A | * | 8/1989 | Lorence et al. ............ 248/311.2 |
| 5,104,184 | A | * | 4/1992 | Kwasnik et al. .......... 297/188.16 |
| 5,104,185 | A | * | 4/1992 | Christiansen et al. .... 297/188.16 |
| 5,104,186 | A | * | 4/1992 | Kwasnik et al. .......... 297/188.16 |
| 5,104,187 | A | * | 4/1992 | Fischer et al. ........... 297/188.16 |
| 5,190,259 | A | * | 3/1993 | Okazaki ................... 248/311.2 |
| 5,232,262 | A | * | 8/1993 | Tseng ..................... 297/188.17 |
| 5,379,978 | A | * | 1/1995 | Patel et al. .............. 248/311.2 |
| 5,516,016 | A | * | 5/1996 | Anderson et al. ............ 224/282 |
| 5,673,891 | A | * | 10/1997 | Fujihara et al. ........... 248/311.2 |
| 5,779,302 | A | * | 7/1998 | Geier et al. ............ 297/188.17 |
| 5,791,618 | A | * | 8/1998 | Lancaster ................ 248/311.2 |
| 5,845,888 | A | * | 12/1998 | Anderson ................ 248/311.2 |
| 5,944,240 | A | * | 8/1999 | Honma ........................ 224/281 |
| 6,076,793 | A | | 6/2000 | Yamamoto |
| 6,464,187 | B1 | * | 10/2002 | Bieck et al. .............. 248/311.2 |
| 6,685,152 | B2 | * | 2/2004 | Shirase et al. ........... 248/311.2 |

FOREIGN PATENT DOCUMENTS

| GB | 2 241 872 | 9/1991 |
| GB | 2 310 791 | 9/1997 |
| JP | 2610389 | 6/1996 |
| JP | 2691424 | 9/1997 |

* cited by examiner

Primary Examiner—Ramon O. Ramirez
Assistant Examiner—Naschica S. Morrison
(74) Attorney, Agent, or Firm—Manabu Kanesaka (57) ABSTRACT A cup holder device includes an attachment base, a holder main member, and a holder arm formed of first to third arms. The first arm has one end part rotatably supported to the holder main member, and the other end part with a first placement portion where the container bottom can be placed. The second arm has one end part rotatably supported to the other end part of the first arm through a first link portion, and a second placement portion at the one end part. In an unfolded state, the second placement portion continues from the first placement portion to support the container bottom. The third arm includes one end part rotatably supported to the other end part of the second arm, and the other end part rotatably supported to the holder main member through a second link portion. Thus, the cup holder device can be made compact and stably hold a container.

8 Claims, 8 Drawing Sheets

CUP HOLDER DEVICE

BACKGROUND OF THE INVENTION AND RELATED ART STATEMENT

The present invention relates to an improvement of a cup holder device provided, for example, inside a vehicle compartment. In the cup holder device, a length of a placement portion can be extended in a sliding direction of a holder main member to place and hold a cup securely.

Conventionally, a cup holder device includes a placement portion arranged under a cup insertion hole of a holder main member for placing a cup. The placement portion is folded or unfolded while the holder main member slides.

For example, Japanese Patent No. 2691424 has disclosed a placement portion composed of a tray 4 and a guide arm 5 (column 4, lines 7–15, FIG. 1). The tray 4 is formed in a dogleg shape, and is composed of an arm portion 4a and a tray portion 4b (column 4, lines 24–28, FIG. 1). A table 3 supports the arm portion 4a through a supporting axis 8 (column 4, lines 24–28, FIG. 1).

A guide axis 9 is provided in the tray portion 4b, and a long guide hole 5a of the guide arm 5 supports the guide axis 9 to be able to slide (column 4, lines 33–35, FIG. 1). The table 3 supports the guide arm 5 through a supporting axis 10 (column 4, lines 36–38, FIG. 1).

Japanese Utility Model No. 2510389 has disclosed a placement portion composed of an arm 16 and a receiving tool 17 (column 3, line 48 to column 4, line 6, FIG. 1). A long hole 13a of the main member 13 supports the arm 16 through a holder bar 14 to be able to slide (column 3, lines 40–47, FIG. 1). The arm 16 and the receiving tool 17 are connected through a link 19 (column 4, lines 4–6, FIG. 1). The table 3 supports the receiving tool 17 as shown FIG. 1 in Japanese Patent No. 2691424.

However, in the above-mentioned cup holder devices, the placement portion for placing the cup bottom is short, thereby making it difficult to hold the cup stably.

Therefore, the present invention has been proposed to solve the problems with conventional technology, and an object of the present invention is to provide a cup holder device, in which a length of a placement portion can be extended in a sliding direction of a holder main member to place and hold the cup securely.

Further objects and advantages of the invention will be apparent from the following description of the invention.

SUMMARY OF INVENTION

In order to solve the problems described above, according to the first aspect of the present invention, a cup holder device includes an attachment base, a holder main member, and a holder arm. The holder arm is formed of the first, second and third arms, and has a placement portion for placing a cup bottom. The placement portion is divided into two parts and folded when the holder main member is stored in the attachment base. When the holder main member is pulled out, the placement portion is extended to place the cup stably without impairing the storage capability.

According to the second aspect of the present invention, the holder arm includes the first link mechanism between the first arm and the second arm, thereby making the configuration simple.

According to the third aspect of the present invention, the holder arm includes the second link mechanism between the holder main member and the third arm, thereby making the configuration simple.

According to the fourth aspect of the present invention, a cup holder device further includes urging means so that the holder arm is extended from the folded state smoothly. Further, according to the fifth aspect of the present invention, the cup holder device includes simplified urging means.

According to the sixth aspect of the present invention, a cup holder device further includes a slider disposed between the attachment base and the holder main member so that the cup holder device has an extended total length relative to a rear side of the attachment base.

BRIEF DESCRIPTION OF THE DRAWINGS

FIG. 5 is a partial side view of the cup holder device as the holder main member is pushed in;

FIG. 8 is a plan view of the cup holder device as the holder main member is pushed in.

DETAILED DESCRIPTION OF PREFERRED EMBODIMENTS

Hereunder, embodiments of the invention will be explained with reference to the accompanying drawings.

Figure 1:
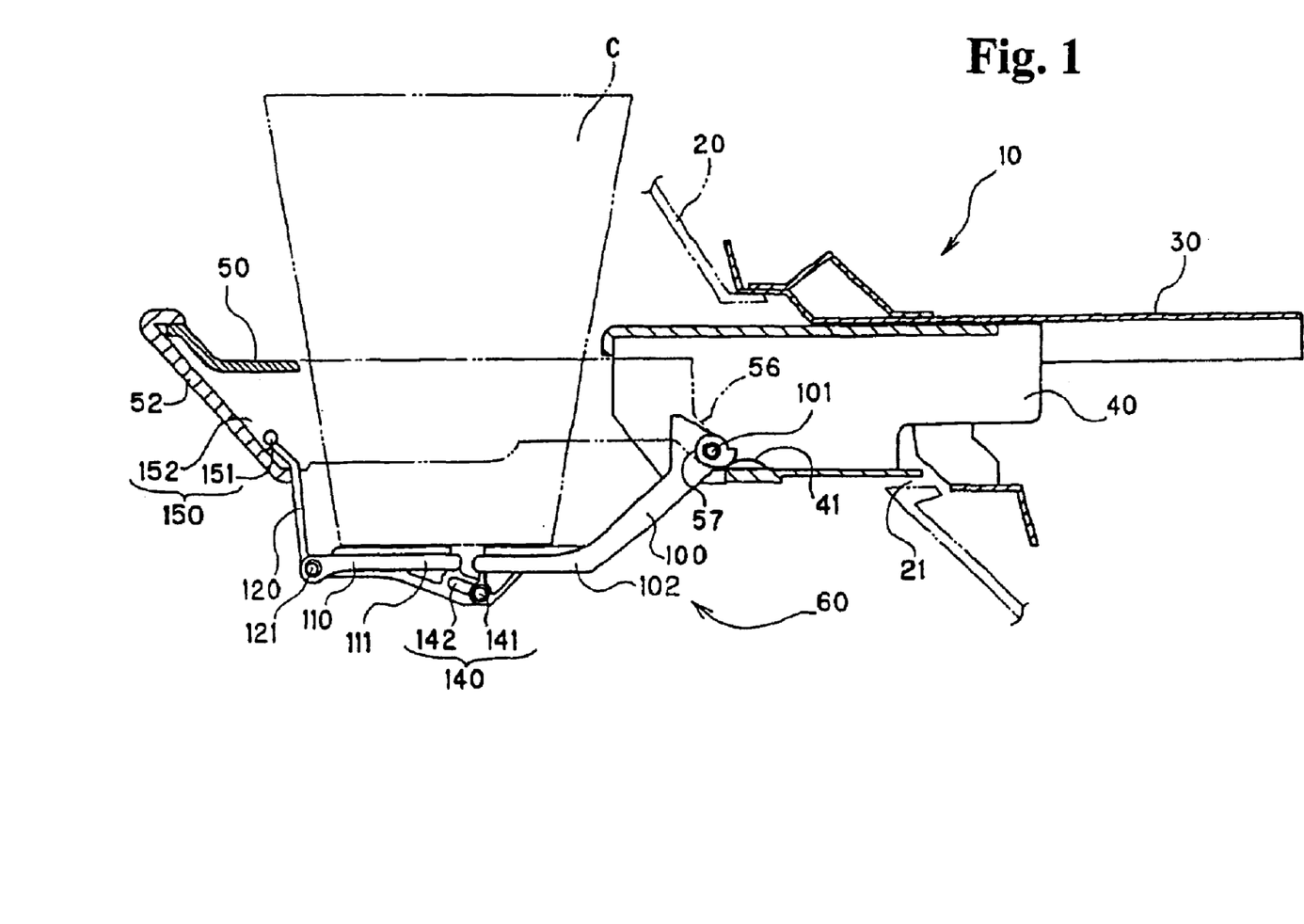
FIG. 1 is a partial side view of a cup holder device in a state where a holder main member is pulled out.
Figure 2:
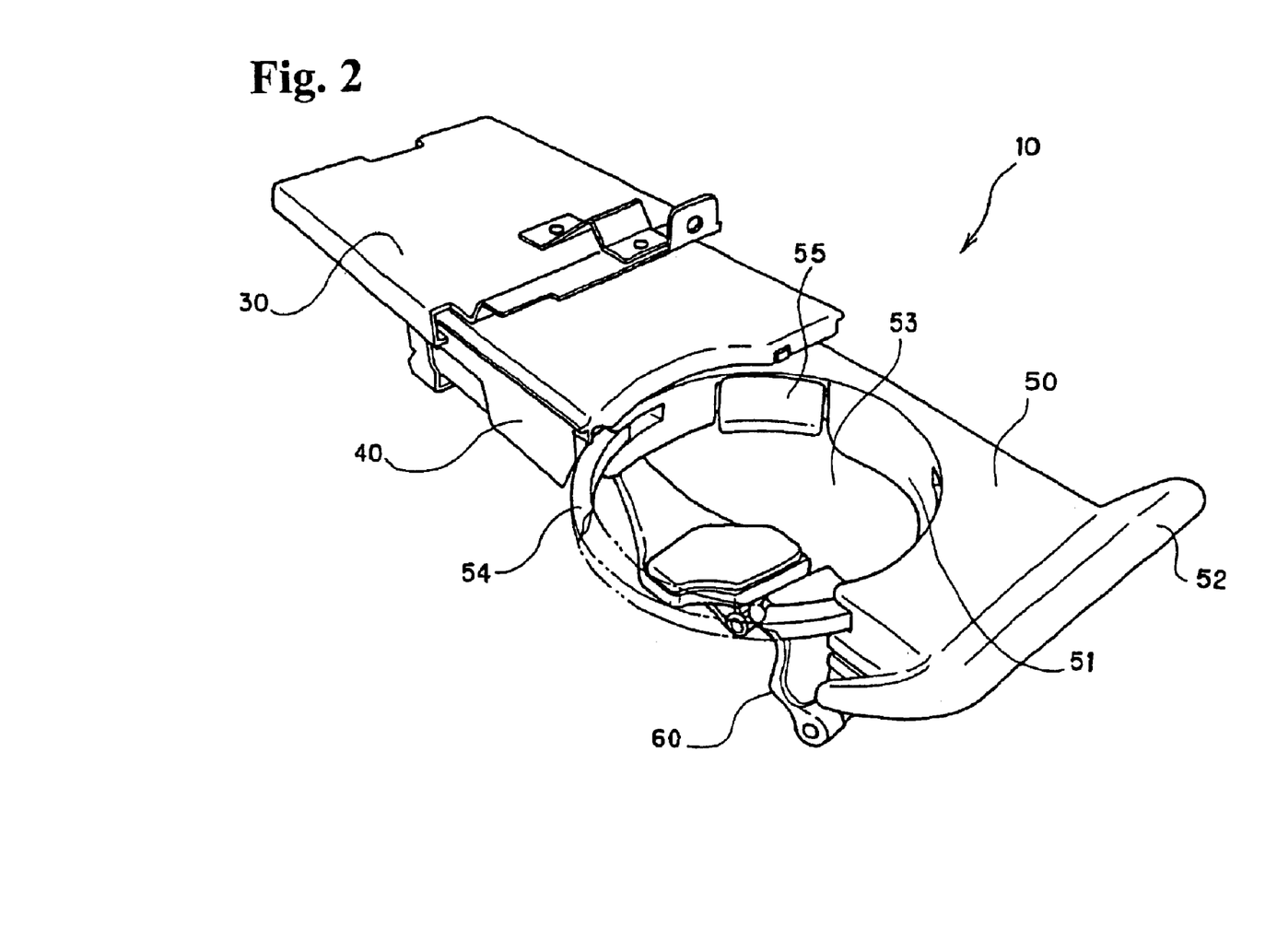
FIG. 2 is a perspective view of the cup holder device in the state where the holder main member is pulled out.
Figure 3:
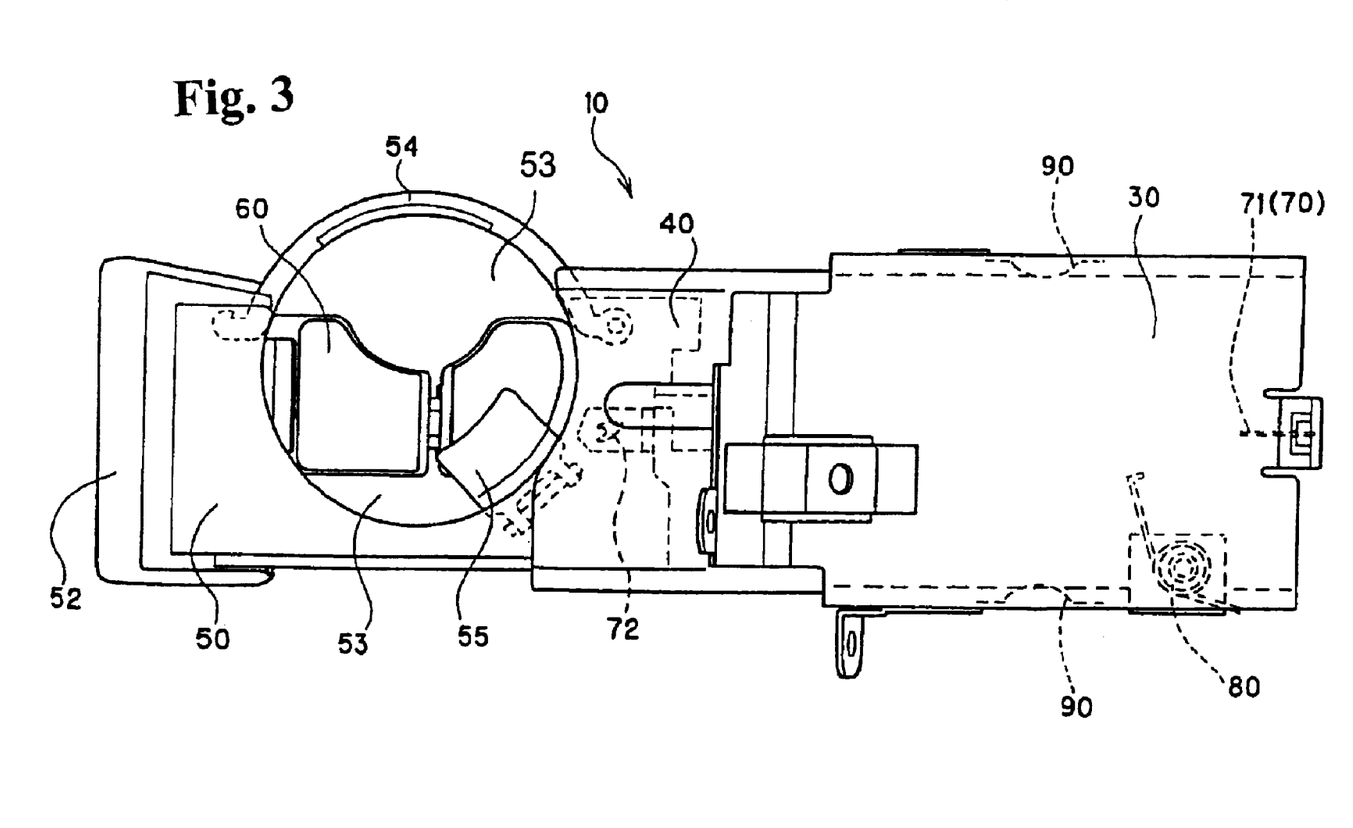
FIG. 3 is a plan view of the cup holder device in the state where the holder main member is pulled out.
Figure 4:
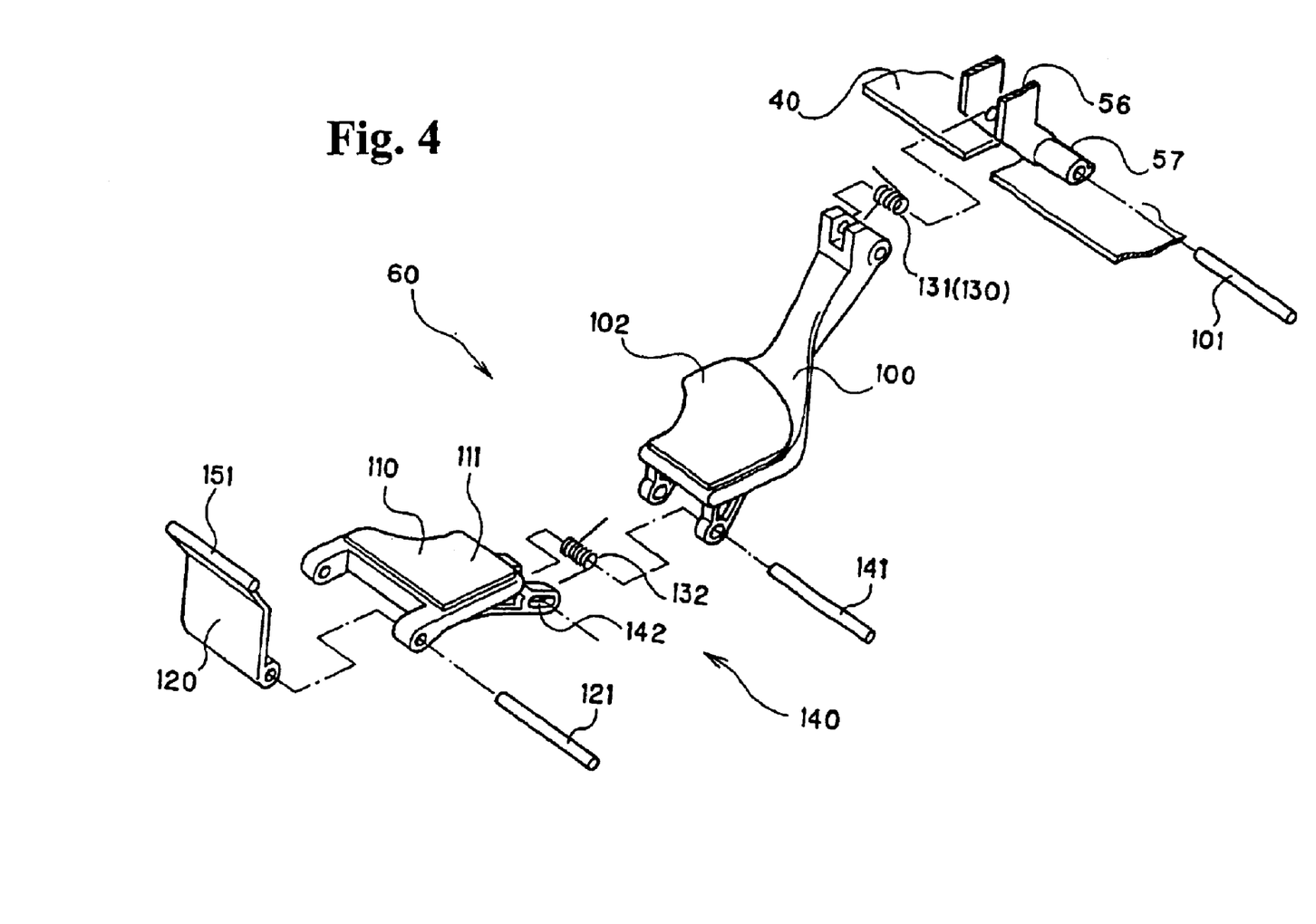
FIG. 4 is an exploded perspective view of a holder arm.
Figure 5:
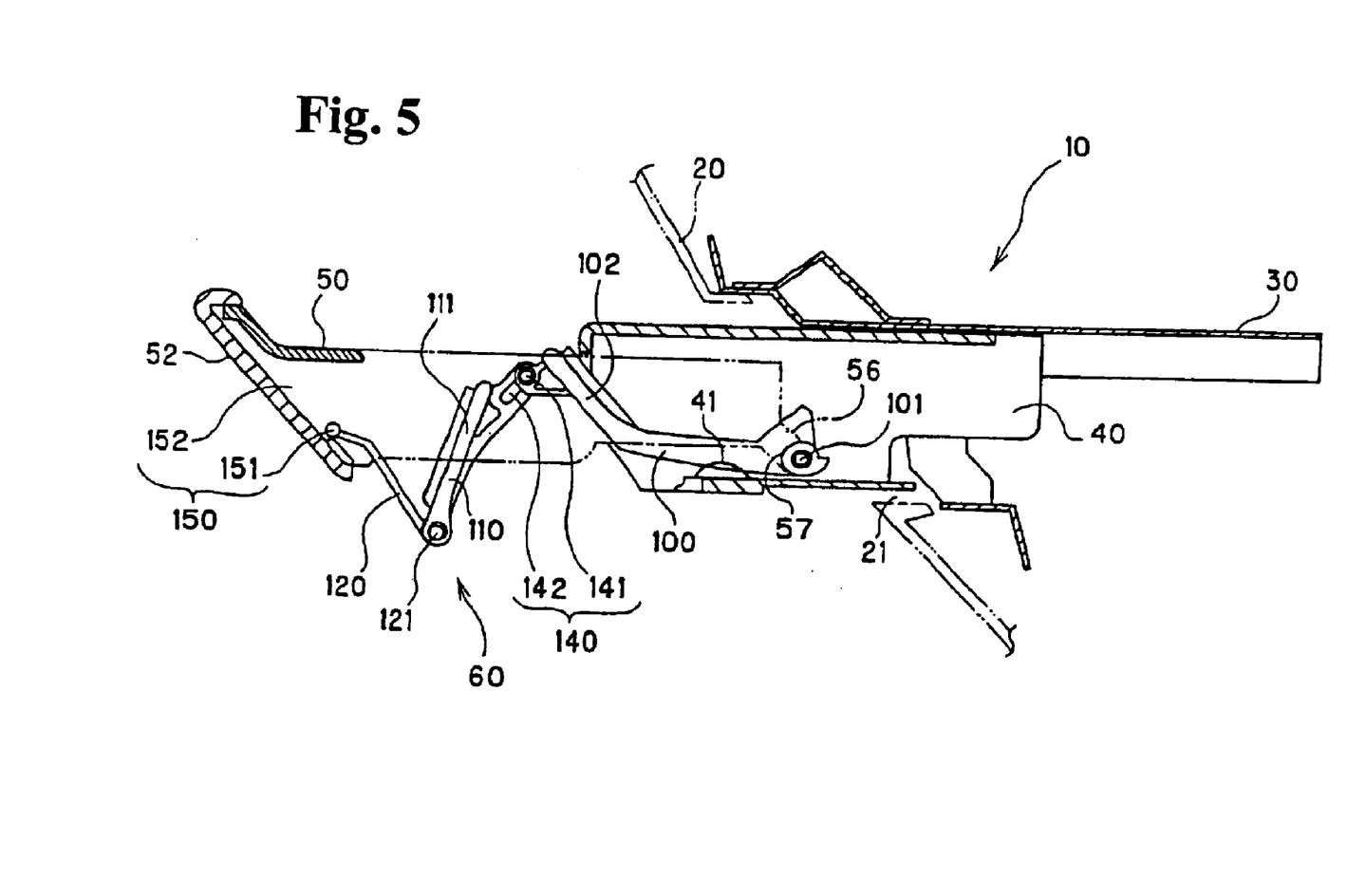
Figure 6:
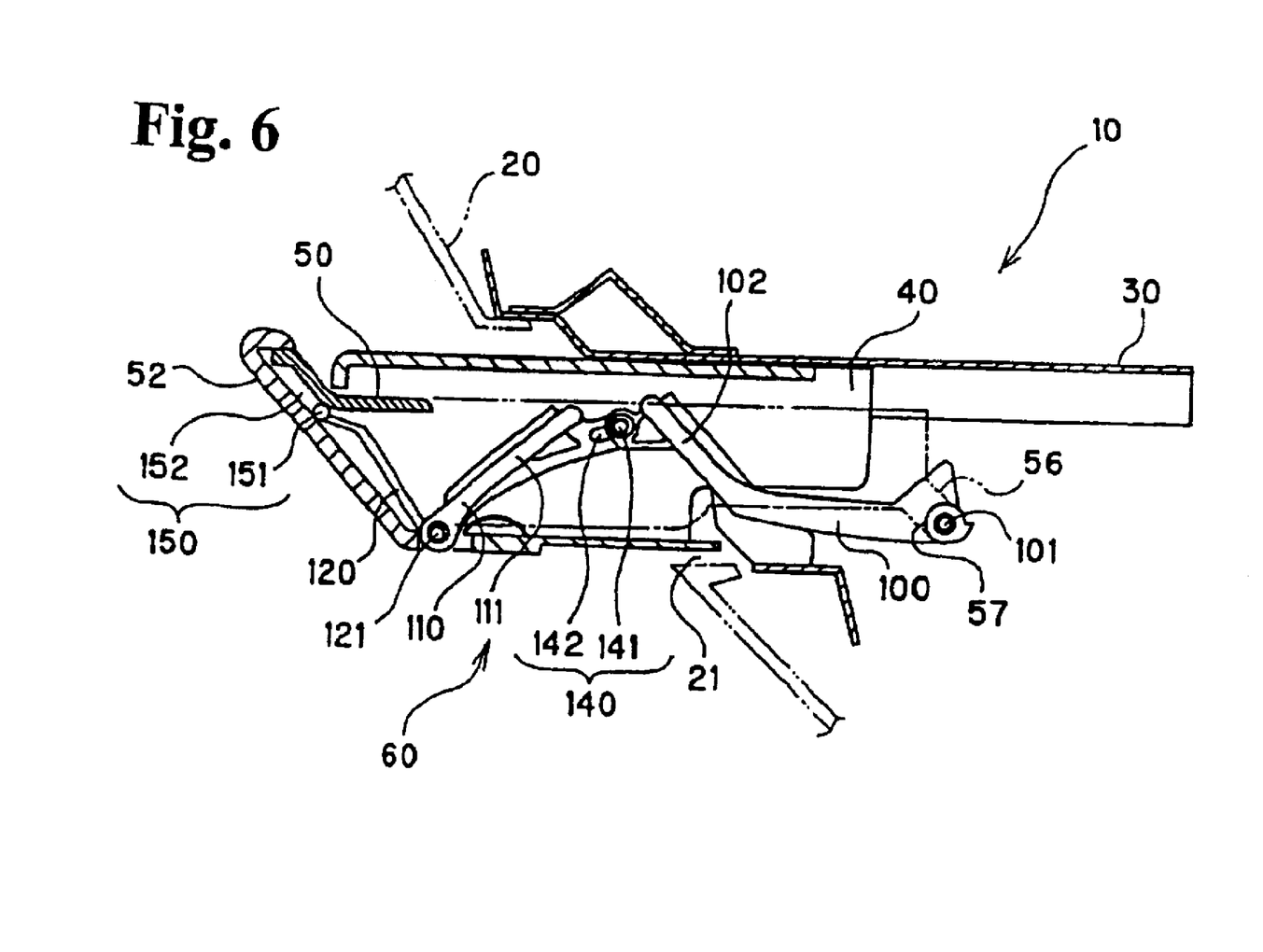
FIG. 6 is a partial side view of the cup holder device in a state where the holder main member is pushed in further from the state of FIG. 5.
Figure 7:
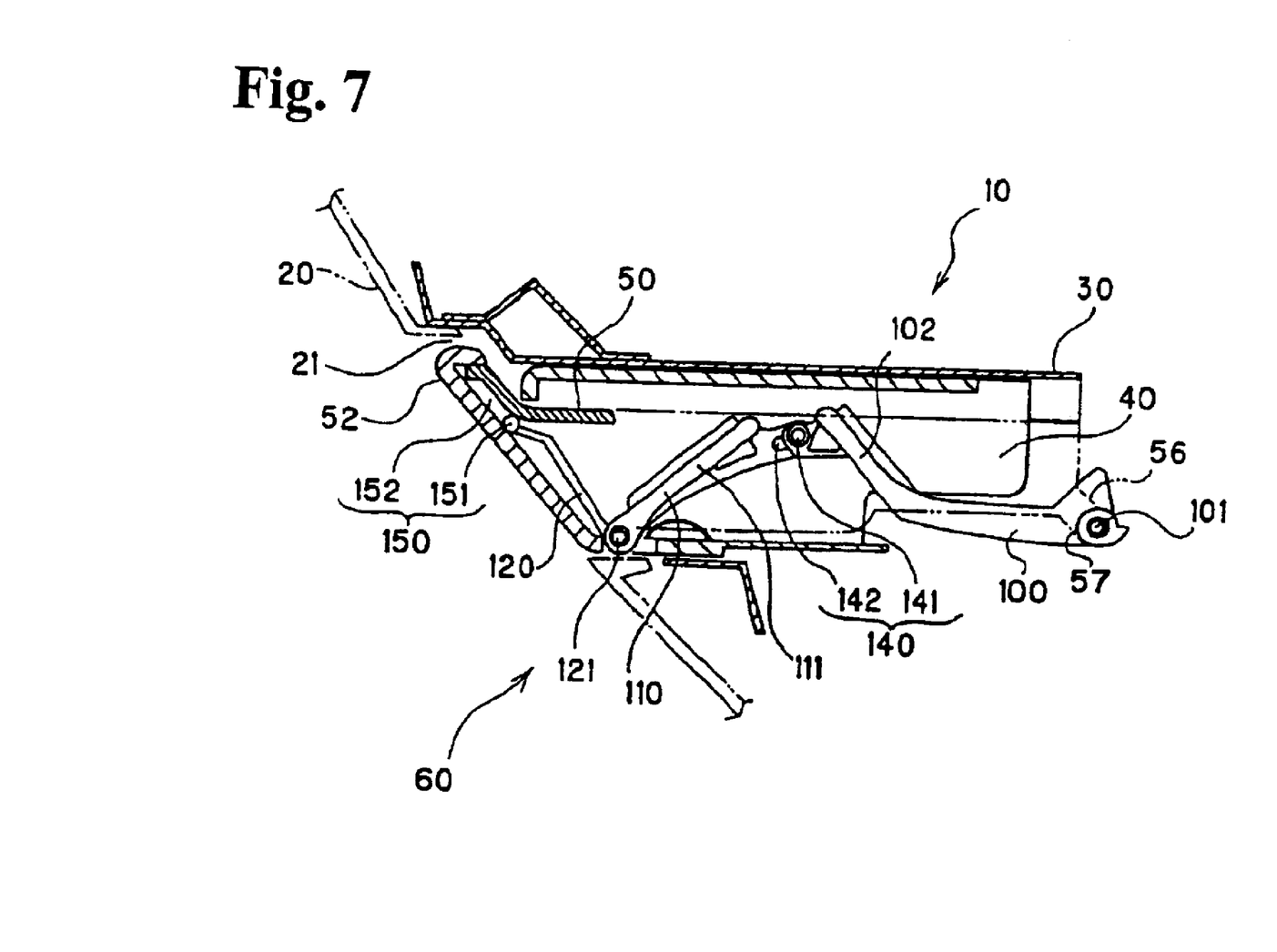
FIG. 7 is a partial side view of the cup holder device in a state where the holder main member is stored.
Figure 8:
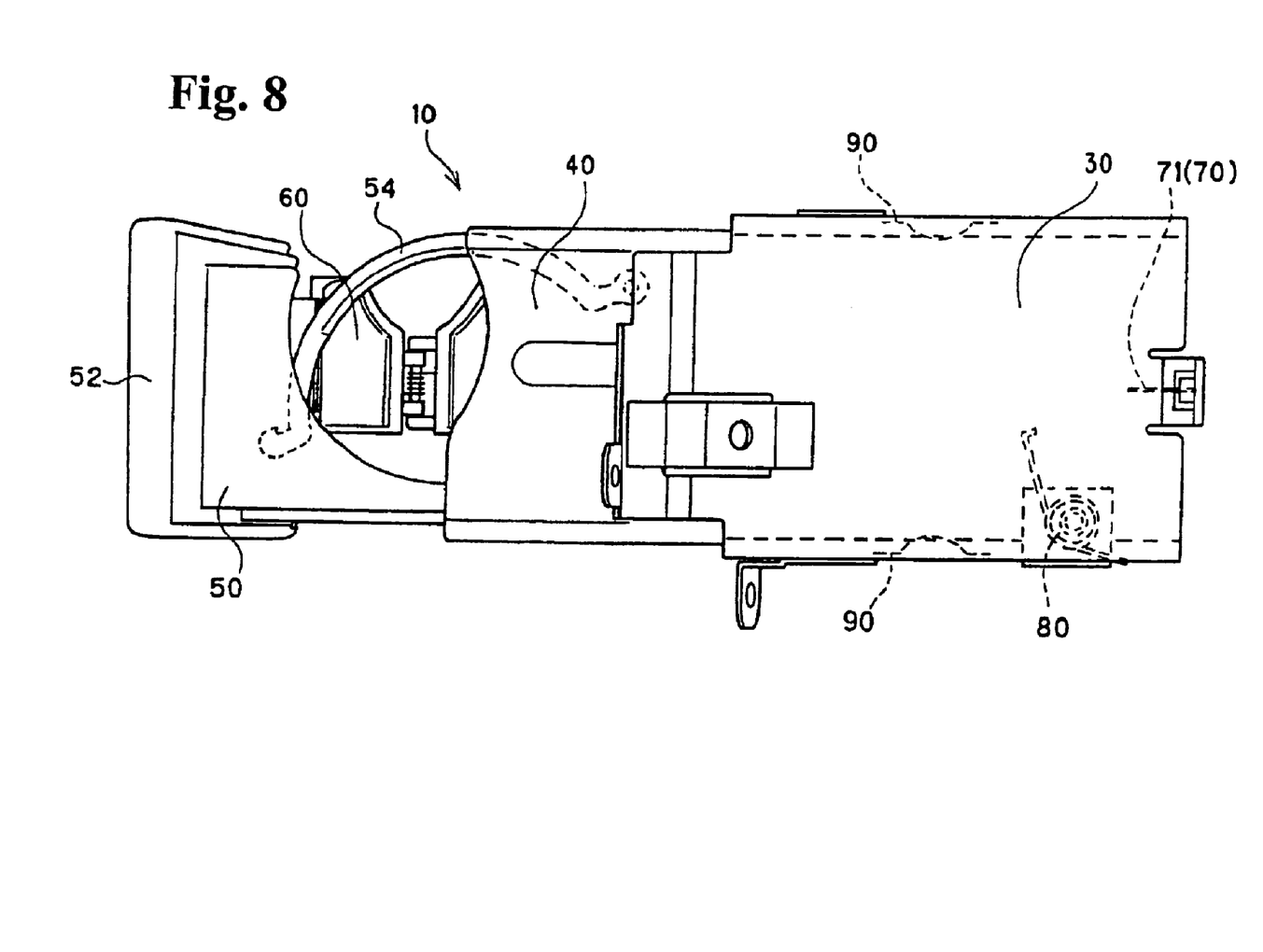

FIGS. 1–8 show an embodiment of the present invention respectively. FIG. 1 is a partial side view of a cup holder device in a state where a holder main member is pulled out; FIG. 2 is a perspective view of the cup holder device in the state where the holder main member is pulled out; FIG. 3 is a plan view of the cup holder device in the state where the holder main member is pulled out; FIG. 4 is an exploded perspective view of a holder arm; FIG. 5 is a partial side view of the cup holder device as the holder main member is pushed in; FIG. 6 is a partial side view of the cup holder device in a state where the holder main member is pushed in further from the state of FIG. 5; FIG. 7 is a partial side view of the cup holder device in a state where the holder main member is stored; and FIG. 8 is a plan view of the cup holder device as the holder main member is pushed in.

As shown in FIG. 1, a cup holder device 10 is fixed to, for example, an instrument panel 20 in a vehicle. The cup holder device 10 can be fixed, but not limited, for example, to the instrument panel 20, a center console or an armrest. The cup holder device 10 can be used in an aircraft or a ship as well.

As shown in FIG. 1, the cup holder device 10 includes an attachment base 30 and a holder main member 50. As shown in FIGS. 1 and 5, the holder main member 50 is supported to be able to slide relative to the attachment base 30, and can be stored inside the attachment base 30. The holder main member 50 includes a container holding portion 51 for receiving a container (for example, a cup C) from above and holding a side of the container in a state where the holder main member 50 is pulled out of the attachment base 30.

As shown in FIG. 1, when the holder main member 50 is pulled out of the attachment base 30, a holder arm 60 unfolds below the container holding portion 51 so that a bottom of the container inserted from the container holding portion 51 can be placed thereon. As shown in FIG. 5, the holder arm 60 is folded when the holder main member is stored inside the attachment base 30.

As shown in FIGS. 1 and 4, the holder arm 60 includes the first arm 100, the second arm 110, and the third arm 120. The first arm 100 is supported at one end thereof to be rotatable relative to the holder main member 50. The first arm 100 has the first placement portion 102 at the other end thereof for placing the container.

The second arm 110 is linked to the first arm 100 to be rotatable at one end thereof through the first link portion 140. When the second arm 110 is unfolded, the second arm 110 is extended from the first placement portion 102 to form the second placement portion 111 for placing the container.

The third arm 120 is linked to the second arm 100 at one end thereof to be rotatable. The other end of the third arm 120 is supported on the holder main member 50 through the second link portion 150 to be rotatable.

As shown in FIG. 1, the first link portion 140 includes the first horizontal axis 141 and the first long hole 142. The first horizontal axis 141 extends perpendicular to a sliding direction of the holder main member 50. The first long hole 142 extends in the sliding direction of the holder main member 50, and supports the first horizontal axis 141 to be rotatable.

As shown in FIG. 1, the second link portion 150 includes the second horizontal axis 151 and the second long hole 152. The second horizontal axis 151 extends perpendicular to the sliding direction of the holder main member 50. The second long hole 152 extends in the sliding direction of the holder main member 50, and supports the second horizontal axis 151 to be rotatable.

As shown in FIG. 4, the holder arm 60 includes urging means 130 for urging the holder arm 60 from a folded state to an unfolded state. The urging means 130 includes the first urging member 131 and the second urging member 132. The first urging member 131 is provided for rotating the first arm 100 downward around the one end of the first arm attached to the holder main member. The second urging member 132 is disposed in the first link portion 140 for extending the first placement portion 102 and the second placement portion 111 in a horizontal direction with each other.

As shown in FIGS. 1 and 5, the cup holder device has a slider 40 that can be stored inside the attachment base 30. The holder main member 50 is supported on the attachment base 30 to be able to slide relative to the slider 40.

More specifically, as shown in FIG. 2, the cup holder device 10 includes the attachment base 30, the slider 40, the holder main member 50, and the holder arm 60. The cup holder device 10 is not limited to include these components. For example, the holder main member 50 may be directly supported in the attachment base 30 without the slider 40.

As shown in FIG. 7, the attachment base 30 is fixed to the instrument panel 20. The slider 40 and holder main member 50 move in and out through an opening 21 of the instrument panel 20.

As shown in FIG. 3, the attachment base 30 includes a lock pin 71 as a locking device 70, a pushing member 80, and sliding members 90. The attachment base 30 is not limited to include these components.

As shown in FIG. 3, the pushing member 80 is disposed at a backside of the attachment base 30 for urging the slider 40 toward the opening 21 up to the middle. Although a spring can be used for the pushing member 80 in this embodiment, it is not limited to the spring. As shown in FIG. 3, the sliding members or sliding contact members 90 are located at both right and left sides of the attachment base 30, and abut against the slider 40 resiliently, so that the sliding members 90 prevent the slider 40 from jolting in right and left directions and give an adequate frictional force when the slider 40 slides. Although the sliding members 90 are formed of leaf springs, they are not limited to the leaf springs.

As shown in FIGS. 1 and 7, the slider 40 is supported to be able to slide relative to the attachment base 30, and can be stored inside the attachment base 30. As shown in FIG. 1, the slider 40 includes, but not limited to, an elastic projection 41. The elastic projection 41 projects upward from a bottom of the slider 40, and abuts against the holder main member 50 resiliently. Although a leaf spring is used for the elastic projection 41 in this embodiment, it is not limited to the leaf spring.

As shown in FIGS. 5 and 7, the holder main member 50 is supported to be able to slide relative to the slider 40, and can be stored inside the attachment base 30 along with the slider 40. As shown in FIG. 1, the holder main member 50 receives the container (cup C) from above in the state where the slider 40 is pulled out, and includes the container holding portion 51 for holding a side of the cup C. As shown in FIGS. 1–3, the holder main member 50 includes, but not limited to, the container holding portion 51, a handle 52, and a cam groove 72 of the locking device 70. The container holding portion 51 receives the cup C from above and holds the side of the received cup C.

As shown in FIGS. 2 and 3, the container holding portion 51 includes, but not limited to, a cup hole 53, a side arm 54, and a holding member 55. The cup hole 53 passes through both sides of the container holding portion 51 and is formed in a semicircular shape. The shape of the cup hole 53 is not limited to the semicircular shape, and can be a circular form or polygon. The side arm 54 blocks an opening at a side of the cup hole 53, and bends in an arc-shape along an inner edge of the cup hole 53. The side arm 54 has one end supported on the holder main member 50, and is urged in a direction projecting from the side opening of the cup hole 53 by a spring (not shown). As shown in FIG. 3, the holding member 55 resiliently projects toward the cup hole 53, and one end of the holding member 55 is supported on the holder main member 50. The holding member 55 is urged in a horizontal direction by a spring (not shown).

As shown in FIGS. 1 and 2, a handle 52 extends diagonally downward, and is used for pulling out the holder main member 50 with a finger.

As shown in FIG. 3, the locking device 70 locks the slider 40 and the holder main member 50 in the stored position inside the attachment base 30 against an urging force of the pushing member 80. The locking device 70 includes the lock pin 71 provided on the attachment base 30 and the cam groove 72 provided on the holder main member 50. The locking device 70 may be formed of a lock pin and a hook, or a raised latch and a strike. In the stored position, the lock pin 71 is locked to the cam groove 72 (not shown), so that the attachment base 30 is locked to the holder main member 50. The slider 40 is locked to the attachment base 30 through the holder main member 50. When the holder main member 50 is pushed in (not shown) to pull out the holder main member 50, the lock pin 71 is released from the cam groove 72, and the slider 40 is pushed to the middle from the opening 21 by the pushing member 80.

As shown in FIG. 1, the holder arm 60 is unfolded or expanded below the container holding portion 51 when the holder main member 50 is pulled out of the slider 40, and the cup C inserted from the container holding portion 51 can be placed thereon. As shown in FIG. 5, when the holder main member is stored inside the attachment base 30 along with the slider 40, the holder arm 60 is stored inside the attachment base 30 in a folded state.

As shown in FIGS. 1 and 4, the holder arm 60 includes, but not limited to, the first arm 100, the second arm 110, and the third arm 120. The first arm 100 has one end rotatably supported on the holder main member 50, and the first placement portion 102 at the other end for placing the cup C. Also, the first arm 100 includes, but not limited to, the first supporting axis 101, the placement portion 102, and the first urging member 131 of the urging means 130. The first supporting axis 101 is supported on a bearing 56 in the holder main member 50 for supporting the first arm 100 to rotate around the first supporting axis 1. The cup C can be placed on the first placement portion 102. The urging means 130 is provided for urging the holder arm 60 from the folded state to the unfolded state, and the first urging member is provided for rotating the first arm 100 downward around the one end supported on the holder main member 50 or the first supporting axis 101. Although the spring is used for the first urging member 131 in this embodiment, it is not limited to the spring.

As shown in FIGS. 1 and 4, the second arm 110 has one end, rotatably linked to the first arm 100 through the first link portion 140. The second arm 110 also has the second placement portion 111 at the other end extending from the first placement portion 102 for placing the cup C when the second arm 110 is unfolded. The second arm 110 includes, but not limited to, the first link portion 140 for supporting the second arm 110 to be able to rotate and slide relative to the first arm 100, the second placement portion 111 extending from the first placement portion 102 for placing the cup C when unfolded, and the second urging member 132. The second urging member 132 is disposed in the first link portion 140 for allowing the first placement portion 102 and the second placement portion 111 to extend in a horizontal direction. Although the spring is used for the second urging member 132, it is not limited to the spring.

As shown in FIGS. 1 and 4, the third arm 120 has one end rotatably linked to the second arm 110 and the other end rotatably linked to the holder main member 50 through the second link portion 150. The third arm 120 includes, but not limited to, the third supporting axis 121 and the second link portion 150. The third supporting axis 121 is provided for supporting one end of the third arm 120 to allow the second arm 110 to rotate. The second link portion 150 is provided for supporting the third arm 120 to be able to rotate and slide relative to the holder main member 50.

As shown in FIGS. 1 and 4, the first link portion 140 is provided for supporting the second arm 110 to be able to rotate and slide relative to the first arm 100. Specifically, the first link portion 140 includes, but not limited to, the first horizontal axis 141 and the first long hole 142. Although the first horizontal axis 141 is provided in the first link portion 140 and the first long hole 142 is provided in the second arm 110 in this embodiment, the first horizontal axis 141 may be provided in the second arm 110 and the first long hole 142 may be provided in the first link portion 140.

As shown in FIGS. 1 and 4, the first horizontal axis 141 provided in the first link portion 140 extends perpendicular to the sliding direction of the holder main member 50. The first long hole 142 provided in the second arm 110 extends in the sliding direction of the holder main member 50, and rotationally supports the first horizontal axis 141. Specifically, the first long hole 142 extends diagonally upward.

As shown in FIGS. 1 and 5, the second link portion 150 is provided for rotationally supporting the third arm 120 and slide relative to the holder main member 50. Specifically, the second link portion 150 includes, but not limited to, the second horizontal axis 151 and the second long hole 152. Although the second horizontal axis 151 is provided in the third arm 120, and the second long hole 152 is provided in the holder main member 50 in this embodiment, the second horizontal axis 151 may be provided in the holder main member 50 and the second long hole 152 may be provided in the third arm 120.

The second horizontal axis 151 provided on the third arm 120 extends perpendicular to the sliding direction of the holder main member 50. The second long hole 152 provided in the holder main member 50 extends in the sliding direction of the holder main member 50, and rotatably supports the second horizontal axis 151. Specifically, the second long hole 152 extends diagonally upward along an inner surface of the handle 52 in the holder main member 50.

As shown in FIG. 1, the bearing 56 extends downward from the holder main member 50 from a backside, and rotatably supports the first supporting axis 101 of the first arm 100. Specifically, the bearing 56 includes, but not limited to, a cylinder portion 57. The cylinder portion 57 extends laterally from a side of the bearing 56, and abuts against the elastic projection 41 of the slider 40.

When the holder main member 50 is pushed from a state where the holder main member 50 is pulled out, the cylinder portion 57 moves over the elastic projection 41, and the holder main member 50 retracts relative to the slider 40. When the cylinder portion 57 moves over the elastic projection 41, a moderate click is generated, and also the holder main member 50 does not move forward inadvertently. When the holder main member 50 is pulled out, the cylinder portion 57 moves over the elastic projection 41 and the holder main member 50 moves forward against the slider 40. At that time, the moderate click also is generated, and an inadvertent backward movement of the holder main member 50 is prevented.

An operation of the cup holder device 10 with the configuration mentioned above will be explained next. In order to store the holder main member 50 inside the attachment base 30, the handle 52 is pushed into the attachment base 30 as shown in FIG. 5. When the holder main member 50 is pushed in, the holder main member 50 retracts relative to the slider 40 as shown in FIG. 5. At this time, the slider 40 pushes a slant surface of the first arm 100 in the holder arm 60, and the holder arm 60 is folded and stored inside the slider 40, as shown in FIGS. 5 and 6.

At the same time, the slider 40 pushes the side arm 54 in the holder main member 50, and the side arm 54 is pulled in the cup hole 53 as shown in FIG. 8. When the handle 52 is further pushed into the attachment base 30, the holder main member 50 pushes the slider 40 to retract inside the attachment base 30, as shown in FIGS. 6 and 7.

The cam groove 72 of the holder main member 50 engages the lock pin 71 at a backside of the attachment base 30 (not shown). The lock pin 71 is then locked inside the cam groove 72, so that the slider 40 and the holder main member 50 are locked in the stored position inside the attachment base 30 as shown in FIG. 7. At this time, the slider 40 pushes the pushing member 80 inside the attachment base 30 to restore the urging force (not shown).

In order to pull out the holder main member SO from the stored state, the handle 52 is slightly pushed into the attachment base 30. When the handle 52 is pushed (not shown), the lock pin 71 disengages from the cam groove 72, and the slider 40 is pushed, outwardly through the opening 21 of the attachment base 30 by the urging force of the pushing member 80. Then, the handle 52 of the holder main member 50 is pulled out with a finger as shown in FIGS. 1–3.

When the holder main member 50 is pulled out, the holder arm 60 unfolds or expands downward by the spring force of the first urging member 131 and the second urging member 132, as shown in FIGS. 1 and 2. At the same time, the side arm 54 projects outwardly toward the side of the holder main member 50 by the spring force of the spring, and the circular container holding portion 51 is formed to be ready to receive the cup C.

The present invention with the above configuration provides the following effects. According to the first aspect of the invention, the placement portion for placing the cup is divided into the two parts, and can be folded when the holder main member is stored. The placement portion can be unfolded to hold the cup stably when the holder main member is pulled out without impairing the storability.

According to the second aspect of the invention, the configuration of the first link portion between the first arm and the second arm is simplified. According to the third aspect of the invention, the configuration of the second link portion between the holder main member and the third arm is simplified. According to fourth aspect of the invention, the holder arm is smoothly unfolded from the folded state with the urging force of the urging means.

According to the fifth aspect of the invention, the configuration of the urging means is simplified. According to the sixth aspect of the invention, the slider is provided between the attachment base and the holder main member so that the drawing length of the holder main member is extended relative to the attachment base.

While the invention has been explained with reference to the specific embodiments of the invention, the explanation is illustrative and the invention is limited only by the appended claims.

What is claimed is:

1. A cup holder device for holding a container, comprising:
   an attachment base,
   a holder main member slidably supported on the attachment base and retained therein, said holder main member including a container holding portion for holding a side of the container,
   a holder arm attached to the holder main member to be unfolded under the container holding portion for placing the container thereon when the holder main member is pulled out from the attachment base and to be folded when the holder main member is stored inside the attachment base, said holder arm including a first arm rotatably connected to the holder main member and having a first placement portion as a part of the first arm, a second arm rotatably connected to the first arm and having a second placement portion for directly supporting a bottom of the container together with the first placement portion when the holder arm is unfolded, and a third arm rotatably connected at one end to the second arm and slidably attached at the other end to the holder main member, and
   urging means attached to the holder arm for urging the same to be unfolded.

2. A cup holder device as claimed in claim 1, wherein said first and second placement portions extend continuously to support the container thereon when the holder arm is unfolded.

3. A cup holder device as claimed in claim 2, further comprising a first link portion disposed between the first arm and the second arm for linking the same, and a second link portion disposed between the second arm and the third arm for linking the same.

4. A cup holder device as claimed in claim 3, wherein said first link portion is formed of a first horizontal axis extending perpendicular to a direction that the holder main member slides, and a first long hole extending in the direction that the holder main member slides for rotatably supporting the first horizontal axis.

5. A cup holder device as claimed in claim 4, wherein said second link portion is formed of a second horizontal axis extending perpendicular to the direction that the holder main member slides, and a second long hole extending in the direction that the holder main member slides for rotatably supporting the second horizontal axis.

6. A cup holder device as claimed in claim 1, wherein said urging means includes a first urging member attached to the first arm for urging the same downward, and a second urging member disposed in a first link portion formed between the first arm and the second arm for urging the first placement portion and the second placement portion to be unfolded in a horizontal direction.

7. A cup holder device for holding a container, comprising:
   an attachment base,
   a holder main member slidably supported on the attachment base and retained therein, said holder main member including a container holding portion for holding a side of the container,
   a holder arm attached to the holder main member to be unfolded under the container holding portion for placing the container thereon when the holder main member is pulled out from the attachment base and to be folded when the holder main member is stored inside the attachment base, said holder arm including a first arm rotatably connected to the holder main member and having a first placement portion as a part of the first arm, a second arm rotatably connected to the first arm and having a second placement portion for directly supporting a bottom of the container together with the first placement portion when the holder arm is unfolded, and a third arm rotatably connected at one end to the second arm and slidably attached at the other end to the holder main member, and
   a slider slidably disposed between the holder main member and the attachment base for supporting the holder main member to be able to slide relative to the attachment base.

8. A cup holder device for holding a container, comprising:
   an attachment base,
   a holder main member slidably supported on the attachment base and retained therein, said holder main member including a container holding portion for holding a side of the container,
   a holder arm attached to the holder main member to be unfolded under the container holding portion for placing the container thereon when the holder main member is pulled out from the attachment base and to be folded when the holder main member is stored inside the attachment base, said holder arm including a first arm rotatably connected to the holder main member and having a first placement portion, a second arm rotatably connected to the first arm and having a second placement portion for holding the container together with the first placement portion, and a third arm rotatably connected to the second arm and the holder main member, and
   urging means attached to the holder arm for urging the same to be unfolded, said urging means including a first urging member attached to the first arm for urging the same downward, and a second urging member disposed in a first link portion formed between the first arm and the second arm, for urging the first placement portion and the second placement portion to be unfolded in a horizontal direction.

* * * * *